//

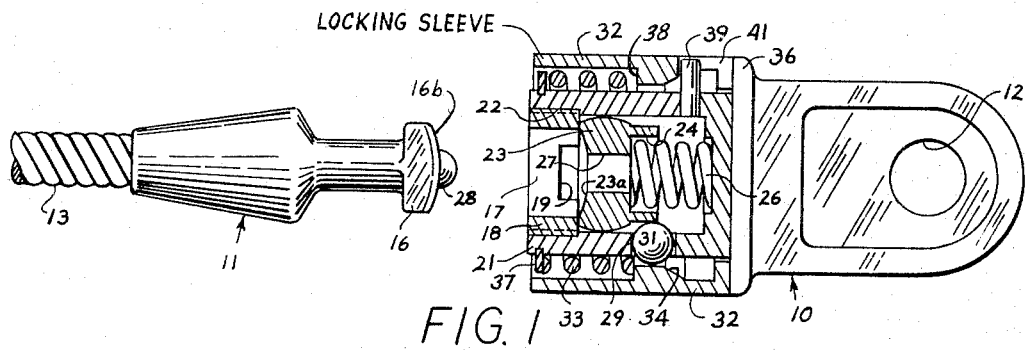
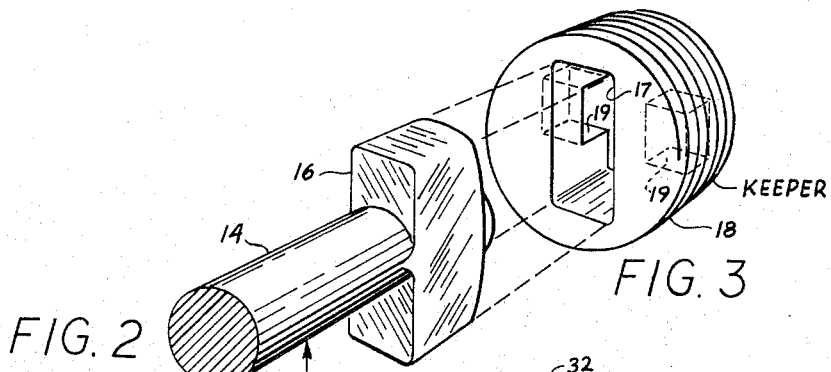
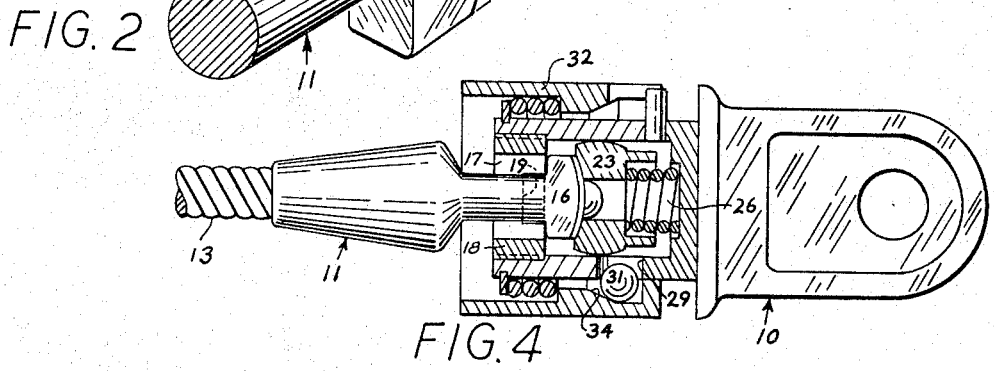
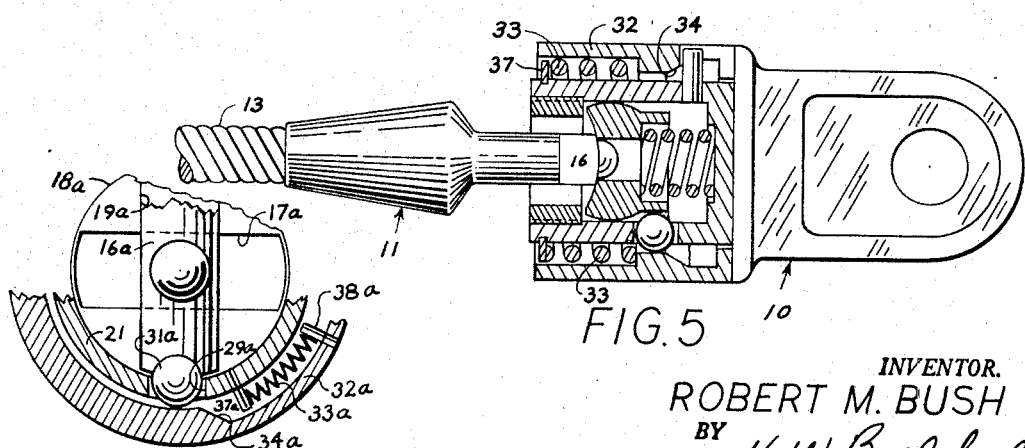

United States Patent Office 3,345,710
Patented Oct. 10, 1967

3,345,710
LOCKING DISCONNECT COUPLING
Robert M. Bush, Goleta, Calif., assignor to Hydranautics, Santa Barbara, Calif., a corporation of California
Filed Feb. 26, 1965, Ser. No. 435,493
6 Claims. (Cl. 24—221)

ABSTRACT OF THE DISCLOSURE

A quick disconnect coupling for wire ropes and similar mechanical members has a T head formed on one end that slips into a slotted socket having a cross slot to seat the T head by a 90° rotation. The T head is locked in place by a spring biased follower on the inside of the socket that presses against the T head in its seated position, and the follower is locked by balls that are moved inwardly by an external sleeve having inclined inner surfaces to contact the balls and hold them inwardly against the follower. Release of the balls is accomplished by actuation of the sleeve.

---

This invention relates to locking mechanisms for disconnect couplings and has particular reference to an automatic locking mechanism that can be unlocked by a manual movement of a part.

Mechanical connectors that can be readily disconnected are generally referred to as quick disconnect couplings. In the mechanical field they are used to connect stressed members together, and find a wide use in the wire rope field. Cables used on cranes, aboard ships, in logging operations and similar fields frequently must be connected to other cables for a particular operation and are thereafter disconnected. Ease in connecting and disconnecting is a prime requisite. Hooks and eyes, shackles and shackle pins, and hooks with hooks are all well known connectors that can be readily connected and disconnected. These and various other well known fittings have the disadvantage of readily coming undone when slack develops in a line or cable, or when vibration becomes excessive. A positive lock becomes necessary to insure that the connection will still be in place when stress is again placed on the cable pair.

The present invention provides a positive lock for connectors of the interfitting type. A spring biased sliding member locks the connectors together at all times and a manual pull against the compression of the spring is required to slide the member so that the interfitting members can be released and disconnected. The sliding of the member unseats locking members. While pawls or lock pins could be used, balls are preferred.

While various interfitting connectors can be used the invention is most applicable with those employing a lost motion; that is, the two connector portions are moved into each other farther than their locking position so that they have to be moved thereafter toward a disconnect direction in order to fully connect the two parts together. In this general class of connectors are T head and slot, bayonet joint, and toggle and hole. The invention will be described with respect to a T head and a slot.

It is therefore a general object of the invention to provide a quick disconnect coupling that is automatically locked.

It is a further object of the invention to provide a coupling of the lost motion type with a positive lock that prevents lost motion during connection, to keep the parts in coupling engagement.

Still another object of the invention is to provide an automatic locking disconnect coupling that may be disconnected with a small manual effort.

Another object is to provide a self-locking disconnect coupling wherein the locking mechanism is simply made of easily formed and inexpensive mechanical parts.

A feature of the invention is the positioning of parts so that accidental blows on the coupling will not cause an unlocking of the coupling.

Other objects, advantages and features of the invention will be apparent in the following description and claims considered together with the drawings forming an integral part of the specification in which:

FIG. 1 is an exploded view of a T head in outline secured to the end of a wire rope and in position to be inserted in a slot coupling shown in section;

FIG. 2 is a fragmentary perspective view on an enlarged scale of the T head of FIG. 1 in position to be inserted in the slot member of the coupling;

FIG. 3 is a perspective view on an enlarged scale of the slot member of the coupling;

FIG. 4 is a view similar to FIG. 1 showing the T head thrust into the coupling the maximum distance and in a position to be rotated 90° to obtain fastening of the T head in the coupling;

FIG. 5 is a view similar to FIG. 1 showing the T head inserted in the coupling but rotated 90° from the insertion position and seated in the connecting position and locked in this position by balls;

FIG. 6 is a fragmentary transverse sectional view of a coupling showing a modified form of ball actuated by rotation of an external sleeve.

Referring to FIGS. 1, 2 and 3, the coupling consists of a female member 10 into which is inserted a male member 11 which for purposes of illustration is of the T head shape. For illustrative purposes also the female member 10 is provided with an eye 12 permitting it to be secured to any device by a pin and the male member 11 is shown as secured to a wire rope 13. Accordingly, the male member 11 and the female member 10 connect the wire rope 13 to any device to which the female member 10 is secured, whether it be a fixed structure, part of a crane or a pin connecting it to another cable.

As shown more distinctly in FIGS. 2 and 3, a shank 14 on male member 11 has a T head 16 formed on the end thereof and this T head 16 fits into a slot 17 in a keeper 18 which is externally threaded to thread into the female member 10. Formed transversely of the slot 17 is a transverse slot which takes the form of notches 19 disposed one on each side of the slot 17. The T head 16 accordingly is pushed through the slot 17, rotated 90°, then is backed out a distance equal to the depth of the notches 19, whereupon it is in an engaged position to securely couple the end of wire rope 13 to the member 10.

Referring now to FIG. 1, it will be noted that the female member 10 or receiver has a flanged cup 21 open towards the T head 16, and the interior rim of this cup 21 is internally threaded at 22 so that the keeper 18 may be threaded into the cup 21. The threads 22 are preferably right-hand threads to resist the dynamic torque action of ordinary wire rope. A set screw (not shown) can lock the keeper 18 in the cup 21. The threading of the keeper 18 into the rim of the cup reduces the end of the cup at the inner end of the slot 17 in the keeper 18. Disposed in the interior of the cup 21 is a follower 23 which is moveable toward and away from the bottom of the cup and which has a cylindrical recess 24 on one end to receive a compression spring 26 which normally urges the follower 23 towards the left in FIG. 1. The external surface of the follower 23 is preferably a section of a sphere to minimize binding during the reciprocation of the follower 23 inwardly and outwardly in the cup 21. The follower 23 is preferably centrally bored 27 to receive a projecting button 28 on the outer portion of the T head 16. The interfitting of the button 28 into the bore 27 maintains a generally axial alignment of the male member 11 with the axis of the female member 10.

While the locking mechanism of the invention may engage directly the T head to keep it in the transverse notches 19, it is presently preferred to apply the locking force to the follower 23. Balls are presently preferred as locking devices. It will be noted that the sidewall of the cup 21 is apertured at 29 to receive a ball 31 which may be moved radially inwardly and outwardly of the cup. Preferably a plurality of such balls are used; for example, three or more, but for purposes of illustration, only one is shown and described. In the disengaged position of the female coupling 10 shown in FIG. 1 the ball 31 rests against the right end of the follower 23. The mechanism for moving the ball 31 inwardly and outwardly of the cup 21 is a cylindrical outer sleeve 32, moveably mounted on the female member 10 and normally biased by a spring 33 to urge it to a position where it will cause the ball 31 to be moved inwardly of the cup 21. The mechanism for moving the ball 31 is a frusto conical incline 34. The external sleeve 32 abuts up against a flange 36 on the cup 21 and is held against it by the spring 33. This flange 36 prevents accidental movement of the sleeve 32 to the left if the female member 10 should strike against an object by protecting the right end of sleeve 32.

The locking sleeve 32 reciprocates left and right as viewed in FIG. 1. The compression spring 33 may be held against the cup 21 by a snap ring 37 and the other end of the spring 33 may abut against an internal shoulder 38 on the sleeve 32. If desired a pin 39 projecting from the cup 21 may fit in a slot 41 to keep the sleeve 32 from rotating on the cup 21. This restraint against rotation permits an operator to grasp the sleeve 32 in one hand and the male member 11 in the other hand and rotate the male member relative to the female member to effect engagement and disengagement.

Referring now to FIGS. 1, 4 and 5, it will be noted that the outer surface of the T head 16 is in the form of a spherical segment 16b and this matches a concave spherical outer surface 23a on the follower 23. This relationship of parts insures that the follower 23 will be in solid contact at all times with the T head 16 even though it might be slightly cocked or twisted with respect to the axis of member 10.

Referring now especially to FIG. 4 the T head 16 is inserted in the keeper 18 through slot 17 by manually grasping the outer sleeve 32 and moving it to the left with respect to the female member 10. This disposes the bottom of the incline 34 opposite the ball retainer hole 29, permitting the ball 31 to be forced radially outwardly. Accordingly when the T head 16 is manually pushed through the slot 17 until it contacts the follower 23 the ball 31 will be moved downwardly as shown in FIG. 4 as the follower 23 is moved to the right against the compression of spring 26.

When the T head 16 has been manually pushed inwardly as shown in FIG. 4 its rear edge has cleared the inner side of the keeper 18 and it then may be manually rotated 90° until the T head is disposed over the notches 19 (FIG. 3). The T head 16 then moves to the left as viewed in FIG. 4 under the urging of spring 26 or in the absence of a spring may be moved to the left manually. The outer sleeve 32 is then permitted to move to the right in FIG. 4 and this causes the incline 34 to move the ball 31 radially inwardly. The result is shown in FIG. 5. In the position of FIG. 5 a push on the male member 11 to move it to the right will not result in any movement because it will force the keeper to the right and the keeper in turn will strike the ball 31. The T head 16 accordingly is locked by the ball 31 so that it can never leave its notches 19. Because of the fact that the sleeve compression spring 33 normally holds the ball 31 in this locked position, the entire action can be referred to as an automatic locking action.

When it is desired to release the T head 16 which is locked in the female member 10 as shown in FIG. 5, the outer sleeve 32 is manually grasped and moved to the left as shown in FIG. 4, whereupon the T head 16 may be moved to the right until its inner edges clear the interior edge of the keeper 18, whereupon it may be rotated 90° to the position shown in FIG. 4 where it is aligned with slot 17 in keeper 18. The T head 16 may then be manually moved to the left in FIG. 4 and the wire rope 13 is then disconnected from the female coupling member 10.

Illustrated in FIG. 6 is a modification of the invention wherein a rotary motion of an outer sleeve 32a causes a ramp or incline 34a to engage a ball 31a held in an opening 29a in a cup 21a. A compression spring 33a held between cup pin 37a and a sleeve pin 38a normally urges the outer sleeve 32a to rotate in a counter-clockwise direction as viewed in FIG. 6. The ball 31a may directly contact the interior surface of a T head 16a to lock it in notches 19a in a keeper 18a disposed tranversely of a keeper slot 17a. Rotation of the outer sleeve 32a of FIG. 6 in a clockwise direction permits the ball 31a to move radially outwardly so that it clears the T head 16a which may then be moved inwardly (toward the viewer) until it clears the notches 19a, whereupon it may be rotated 90° to be moved outwardly (away from the viewer) in the slot 17a.

It will be noted that the sleeve 32 of FIGS. 1, 4 and 5 may be simply made of tubular stock by a lathe operation. The ball 31 is inexpensively purchased and the compression spring 33 may be a stock item. The entire locking mechanism is therefore simple in design, inexpensive to manufacture, and reliable in operation. Furthermore, manual operation is simple in that a single operator may grasp the sleeve 32 in one hand and the T head body in the other, and push and pull and rotate them relative to each other to quickly effect connection, locking and disconnection. Suitable retainers may be employed on the device of FIG. 6 to keep the ball 31a from moving inwardly.

While the invention has been described with respect to specific embodiments thereof, it is not limited to these embodiments, and there is included within the scope of the following claims all variations and modifications that fall within the true spirit and scope of the invention.

What is claimed is:
1. A locking disconnect coupling comprising:
 (a) a T head;
 (b) a receiver having an aperture slot through which the T head can pass and having an inner end with a transverse slot in which the T head may seat;
 (c) a follower carried by the receiver disposed at said inner end of the receiver to be engaged by the T head when it passes through the aperture slot and moveable to a locking position when the T head is seated;
 (d) a ball carried by the receiver adjacent to the follower locking position and moveable toward the follower to engage it to lock in locking position, and away from the interior of the receiver to release the follower;
 (e) an external sleeve slidably mounted on the receiver and having an inner surface; and
 (f) a frusto conical incline on the inner surface of the sleeve adjacent to the ball,
whereby sliding movement of the sleeve will cause the incline to engage the ball and move it inwardly of the receiver or permit it to move outwardly of the receiver.

2. A locking disconnect coupling as set forth in claim 1 wherein a spring carried by the receiver normally urges the sleeve to a ball-locking position.

3. A locking disconnect coupling as set forth in claim 2 wherein a flange is disposed on the receiver with a transverse dimension at least as great as the external dimensions of the sleeve and against which the sleeve abuts under the urging of the spring, said flange preventing accidental unlocking of the coupling under accidental blows.

4. A locking disconnect coupling comprising:
(a) a T head male member;
(b) a female member having a non-circular aperture to receive the T head and having an enlarged interior at the inner end of the aperture to permit rotation of the T head out of alignment with the non-circular aperture to create a coupling engagement between the T head and the female member;
(c) a ball carried by the female member and moveable inwardly of the female member to lock the T head in its coupling engagement and moveable outwardly to release the T head from its coupling engagement;
(d) an external sleeve moveably mounted on the female member and having an inner surface;
(e) and means on the inner surface of the sleeve to engage the ball to move it inwardly or permit outward movement of the ball dependent upon the position to which the sleeve is moved, whereby movement of the sleeve moves the ball inwardly to engage the T head and lock it in coupling engagement and additional movement of the sleeve releases the ball so that it unlocks the T head.

5. A locking disconnect coupling as set forth in claim 4 wherein resilient means are carried by the female member to move the external sleeve to a ball-locking position.

6. A locking disconnect coupling comprising:
(a) a T head;
(b) a cup interiorly threaded at the lip and having a side wall aperture;
(c) an aperture member threaded in the cup having a slot large enough to receive the T head and cross slotted on the inner side to seat the T head;
(d) a follower disposed in the cup for reciprocation therein and having means engageable by a ball to prevent movement of the follower;
(e) a spring in the cup normally urging the follower toward the aperture member;
(f) a ball disposed in the cup sidewall aperture;
(g) a sleeve disposed over the cup for reciprocation therein and having an inner surface with a frusto conical portion to create a region of lesser diameter;
(h) and resilient means urging the sleeve to a position to dispose the region of lesser diameter opposite the cup sidewall aperture, whereby the sleeve region of lesser diameter forces the ball inwardly of the cup to prevent movement of the follower past the cup sidewall aperture to thereby lock the T head in the aperture member.

References Cited

UNITED STATES PATENTS

| | | | |
|---|---|---|---|
| 195,400 | 9/1877 | Richard | 24—123 |
| 1,199,690 | 9/1916 | Gillan | 24—221 |
| 1,341,934 | 6/1920 | Schoenborn | 279—81 |
| 2,959,943 | 11/1960 | Allen | 64—9 |
| 3,251,605 | 5/1966 | Ondeck | 279—82 |

FOREIGN PATENTS 1,092,470  11/1954  France.

OTHELL M. SIMPSON, *Primary Examiner.*

E. SIMONSEN, *Assistant Examiner.*